(12) United States Patent
Andri

(10) Patent No.: US 9,298,832 B2
(45) Date of Patent: Mar. 29, 2016

(54) COLLABORATIVE GROUP SEARCH

(71) Applicant: Michael J. Andri, Portland, OR (US)

(72) Inventor: Michael J. Andri, Portland, OR (US)

(*) Notice: Subject to any disclaimer, the term of this patent is extended or adjusted under 35 U.S.C. 154(b) by 0 days.

(21) Appl. No.: 14/531,601

(22) Filed: Nov. 3, 2014

(65) Prior Publication Data
US 2015/0154296 A1    Jun. 4, 2015

Related U.S. Application Data

(63) Continuation of application No. 13/653,056, filed on Oct. 16, 2012, now Pat. No. 8,880,495.

(51) Int. Cl.
*G06F 17/30* (2006.01)
*G06Q 30/02* (2012.01)
(Continued)

(52) U.S. Cl.
CPC .... *G06F 17/30864* (2013.01); *G06F 17/30672* (2013.01); *G06F 17/30749* (2013.01); *G06Q 30/0267* (2013.01); *H04L 67/10* (2013.01); *H04L 67/42* (2013.01)

(58) Field of Classification Search
CPC ............ G06F 17/30672; G06F 17/30749; G06F 17/30864; G06F 17/30867; G06F 19/3418; G06F 19/3481; G06F 17/3053; G06F 17/30598; G06F 17/30011; G06F 17/30424; G06F 17/30554; G06F 17/30; G06F 17/30268; G06F 17/30339; G06F 17/30663; G06Q 30/0267; G06Q 30/0255; G06Q 30/02; G06Q 30/06; G06Q 50/01; G06Q 10/10; G06Q 30/0269; G06Q 10/00; G06Q 10/02; G06B 13/2403; H04L 67/10; H04L 67/42

USPC .......... 707/706, 769, 796, E17.014, E17.043, 707/E17.108; 455/456.6, 456.3, 563, 562.1; 715/716, 753; 705/7.13; 704/235, 275, 704/233, 270.01, 244, 251, 258; 709/204
See application file for complete search history.

(56) References Cited

U.S. PATENT DOCUMENTS

| | | | |
|---|---|---|---|
| 7,483,883 B2 * | 1/2009 | Barth ............... | G06F 17/30867 707/E17.014 |
| 8,775,355 B2 * | 7/2014 | Kshetramade et al. ......... 706/50 | |

(Continued)

OTHER PUBLICATIONS

Roberto Navigli and Giuseppe Crisafulli—"Inducing word senses to improve web search result clustering"—Published in: Proceeding EMNLP '10 Proceedings of the 2010 Conference on Empirical Methods in Natural Language Processing—MIT, Massachusetts, USA, Oct. 9-11, 2010—pp. 116-126.*

(Continued)

*Primary Examiner* — Anh Ly
(74) *Attorney, Agent, or Firm* — Michael J. Andri

(57) ABSTRACT

Collaborative group search is achieved by obtaining, over a wide area network, a plurality of search queries initiated by a plurality of client devices. A group of two or more client devices is identified from among the plurality of client devices. Each client device of the group exhibits a content relatedness of the search query relative to other search queries, a time proximity of the search query relative to other search queries, and/or a geographic proximity of the client device to other client devices. Search queries initiated by the group are processed via a search engine to obtain search results for the group having increased search result diversity relative to each other. Search results are returned to the client device of the group via the wide area network. Search result diversity may include different ordering of search results among client devices of group.

18 Claims, 8 Drawing Sheets

(51) Int. Cl.
*H04L 29/08* (2006.01)
*H04L 29/06* (2006.01)

(56) References Cited

U.S. PATENT DOCUMENTS

| | | | |
|---|---|---|---|
| 8,838,583 B1* | 9/2014 | Fox ............................... | 707/723 |
| 2002/0123989 A1* | 9/2002 | Kopelman et al. ................ | 707/3 |
| 2003/0014399 A1* | 1/2003 | Hansen et al. .................... | 707/3 |
| 2006/0026147 A1* | 2/2006 | Cone ................ | G06F 17/30867 |
| | | | 707/E17.109 |
| 2006/0178215 A1* | 8/2006 | Lehikoinen et al. ............ | 463/39 |
| 2007/0192293 A1* | 8/2007 | Swen ................ | G06F 17/30696 |
| | | | 707/E17.082 |
| 2008/0183694 A1* | 7/2008 | Cane ................ | G06F 17/30867 |
| | | | 707/E17.014 |
| 2009/0198666 A1* | 8/2009 | Winston ................ | G06Q 50/01 |
| | | | 707/E17.108 |
| 2009/0198675 A1* | 8/2009 | Mihalik ............ | G06F 17/30873 |
| | | | 707/769 |
| 2009/0292696 A1* | 11/2009 | Shuster ............................ | 707/5 |
| 2010/0262367 A1* | 10/2010 | Riggins ................ | G06Q 10/10 |
| | | | 701/533 |
| 2010/0317393 A1* | 12/2010 | Gunnarsson et al. ......... | 455/522 |
| 2011/0231254 A1* | 9/2011 | Lee et al. .................... | 705/14.49 |
| 2012/0036148 A1* | 2/2012 | Jain et al. ...................... | 707/769 |
| 2013/0018960 A1* | 1/2013 | Knysz et al. .................. | 709/204 |
| 2013/0066963 A1* | 3/2013 | Odio et al. .................... | 709/204 |
| 2013/0080348 A1* | 3/2013 | Pantaliano et al. ............ | 705/347 |
| 2013/0132431 A1* | 5/2013 | Platt ................ | G06F 17/30241 |
| | | | 707/770 |

OTHER PUBLICATIONS

Songhua Xu et al.—"Observing facial expressions and gaze positions for personalized webpage recommendation"—Published in: Proceeding ICEC '10 Proceedings of the 12th International Conference on Electronic Commerce: Roadmap for the Future of Electronic Businessz—Aug. 2-4, 2010, Honolulu, HI, USA—pp. 78-87.*

* cited by examiner

```
SEARCH SETTINGS                                        800

GROUP SEARCH:              ON / OFF
   GROUP RESULT DIVERSITY:    HIGH / MED / LOW / OFF
   GROUP QUERY DIVERSITY:     HIGH / MED / LOW / OFF
   GROUP RESULT BLENDING:     HIGH / MED / LOW / OFF
   GROUP QUERY BLENDING:      HIGH / MED / LOW / OFF
   GROUP RESULT HARMONIZATION: HIGH / MED / LOW / OFF
   GROUP QUERY HARMONIZATION:  HIGH / MED / LOW / OFF

GROUPS:    EDIT
       GROUP A: MEMBER A, MEMBER B, MEMBER C
       GROUP B: MEMBER B, MEMBER D, MEMBER E
       GROUP C: MEMBER B, MEMBER F, MEMBER G
```

FIG. 8

COLLABORATIVE GROUP SEARCH

CROSS-REFERENCE TO RELATED APPLICATIONS

The present application is a continuation of and claims priority to U.S. non-provisional application Ser. No. 13/653,056, titled SEARCH QUERY EXPANSION AND GROUP SEARCH, filed Oct. 16, 2012, the contents of this application are incorporated herein by reference in their entirety for all purposes.

BACKGROUND

Search engines return search results responsive to search queries. For example, the GOOGLE brand of search engine includes a network-based service that enables clients to submit search queries and receive search results over a communications network, such as the Internet. Search queries include search terms (e.g., keywords) that can originate from text strings manually input by a user. Search queries may alternatively originate from voice-based commands spoken by a user.

SUMMARY

In one example, search query expansion is disclosed. Audio information received via a microphone of a computing device is recorded in an overwriteable circular buffer of the computing device. The overwriteable circular buffer has a limited data storage capacity in which older audio information is overwritten with newer audio information upon reaching the limited data storage capacity. Construction of a search query is initiated by receiving a user input via a text-based user interface of the computing device. The user input includes one or more keywords forming a user-defined portion of the search query. At least a portion of the audio information recorded in the overwriteable circular buffer is processed on-board the computing device or remotely by a server system to obtain one or more additional keywords forming an expanded portion of the search query. The portion of the audio information containing the one or more additional keywords is received and recorded in the overwriteable circular buffer prior to construction of the search query by the user and prior to receiving the user input including the one or more keywords. The search query including the user-defined portion and the expanded portion is supplied to a search engine. The search engine may reside on-board the computing device or at a remote server system. A response to the search query is received from the search engine. The response is generated by the search engine based, at least in part, on the one or more keywords of the user-defined portion and the one or more additional keywords of the expanded portion of the search query.

In another example, collaborative group search is disclosed. A plurality of search queries initiated from a plurality of computing devices are received at a server system that hosts a search engine. The plurality of search queries are processed to identify one or more user groups. One or more group attributes for each user group are identified. For each user group, each search query and each group attribute of that user group is associated with a group identifier. One or more search queries of a user group may be augmented to obtain one or more augmented search queries based, at least in part, on one or more group attributes for that user group. The one or more search queries and/or one or more augmented search queries of the user group are processed by the search engine to obtain one or more search results. The one or more search results of the user group may be augmented to obtain one or more augmented search results based, at least in part, on one or more group attributes for that user group. The one or more search results and/or the one or more augmented search results may be transmitted to the computing devices of the user group.

Claimed subject matter, however, is not limited by this summary as other implementations and examples are disclosed by the following written description and associated drawings.

BRIEF DESCRIPTION OF DRAWINGS

FIG. 8 is a schematic diagram depicting an example user interface of a computing device according to one implementation.

DETAILED DESCRIPTION

An expanded search query is disclosed that includes a user-defined portion constructed by a user containing one or more keywords, and an expanded portion obtained from pre-recorded audio information containing one or more additional keywords. Keywords of the user-defined portion may be obtained as textual characters manually entered or selected by a user, or may be spoken by the user during construction of the search query. The keywords of the user-defined portion are thereby intentionally directed by the user to the search engine, and are intended to form part of the search query. By contrast, keywords of the expanded portion of the search query are obtained from audio information that is recorded prior to the user initiating construction of the search query with the user-defined portion. The pre-recorded audio information may contain a natural language conversation between two or more persons, which may or may not include the user. Typically, the keywords of the expanded portion of the search query were not intended to form part of the search query at the time they were spoken and recorded. Instead, these keywords were spoken for the purpose of facilitating human communication rather than construction of a search query.

Figure 1:
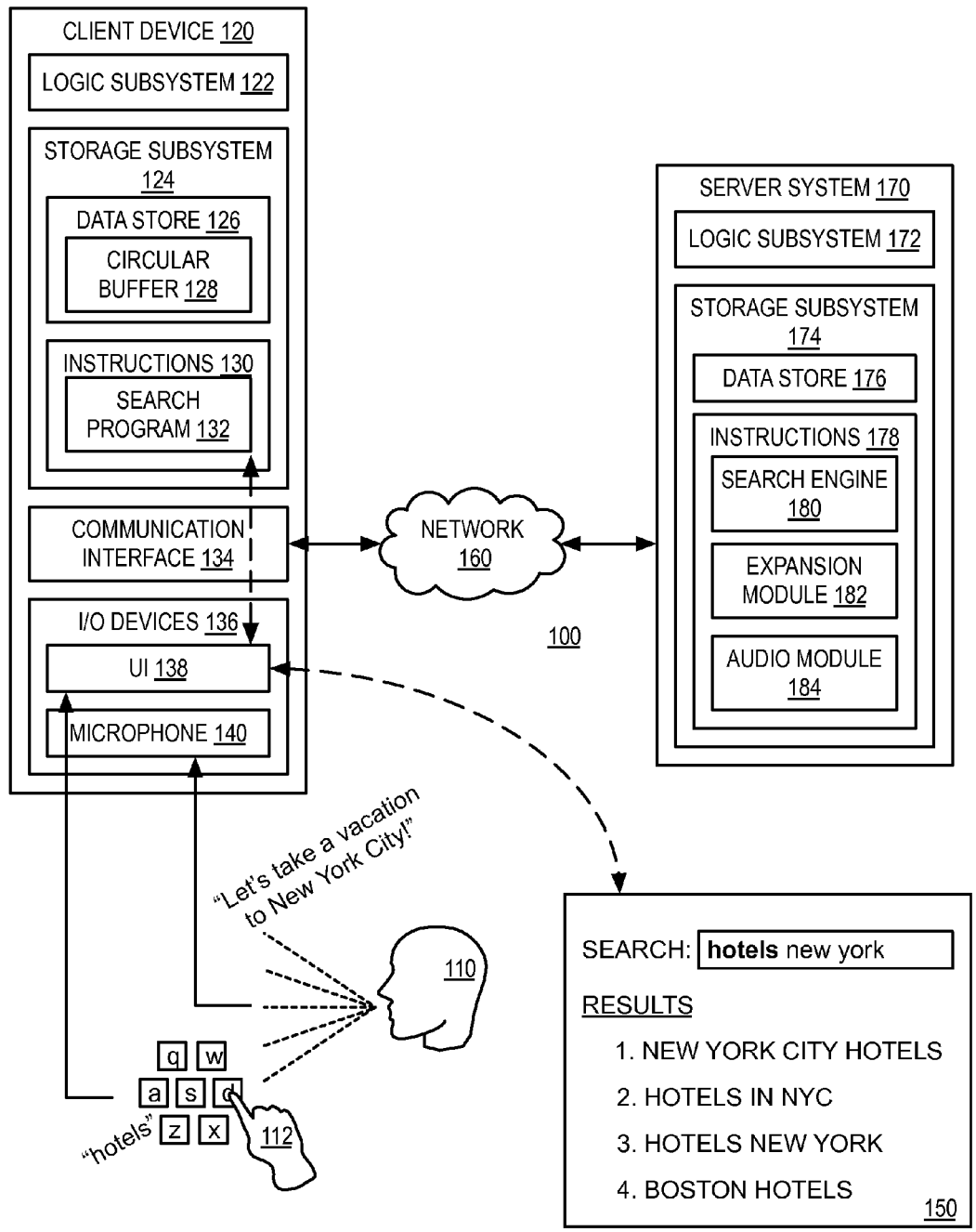
FIG. 1 is a schematic diagram depicting an example computing system according to one implementation.

FIG. 1 is a schematic diagram depicting an example computing system 100 according to one implementation. Within FIG. 1, a person 110 is speaking aloud, in an audio manner to another person: "Let's take a vacation to New York City!" Audio information including the spoken language "Let's take a vacation to New York City!" and other sounds, conversations, etc. is received via a microphone 140 and recorded or otherwise stored in storage subsystem 124 of client device 120. Alternatively or additionally, the audio information received via microphone 140 may be processed to obtain compressed, encrypted, encoded, and/or filtered version of the audio information, which may be recorded or otherwise stored in storage subsystem 124. Such processing may further include the application of speech recognition to the audio information extract keywords, which may be recorded or otherwise stored in storage subsystem 124 in addition to or as an alternative to the audio information.

Storage subsystem 124 may include a data store 126 holding information and instructions 130 that may be executable by logic subsystem 122 of client device 120. In at least some implementations data store 126 may include an overwriteable circular buffer 128 or other suitable data storage element having a limited data storage capacity. The overwriteable circular buffer has a limited data storage capacity in which older audio information is overwritten with newer audio information by client device 120 upon reaching the limited data storage capacity. The limited data storage capacity of circular buffer 128 may be less than the data storage capacity of data store 126. For example, data store 126 may include, store, or hold other information, and may be substantially larger in capacity than circular buffer 128.

The limited data storage capacity of circular buffer 128 may be imposed by a physical constraint, such as a data storage capacity of a storage device or element forming part of data store 126, and/or may be imposed by a virtual constraint, such as by instructions 130 limiting storage of the recorded audio and information derived therefrom to specific memory locations or memory elements within storage subsystem 124. As a non-limiting example, circular buffer 128 may have a data storage capacity that limits an amount of recorded audio information to defined duration of X seconds, minutes, hours, or days. For example, circular buffer 128 may be limited to holding 15 seconds of audio information at a recording sampling rate sufficient to enable keywords to be extracted from the audio information. As another non-limiting example, circular buffer 128 may be limited to holding X bits or bytes of information, including e.g., keywords processed from the audio information. For example, circular buffer 128 may be limited to holding X characters defining one or more keywords extracted from the audio information.

Privacy concerns among users of client device 120 and/or persons speaking within vicinity of client device 120 may be ameliorated, reduced, or eliminated by limiting the amount of audio information and/or the amount of information derived or otherwise extracted from the audio information recorded or stored on-board the client device, and/or by overwriting older audio information or derived information with newer audio information or derived information. This approach recognizes that persons may be less inclined to avail themselves of the beneficial services, techniques, and practices disclosed herein with respect to expanded search queries unless their recorded conversations are limited in scope to a suitable level. It will be understood in light of this disclosure that societal comfort with respect to the recording of conversations may change over time, and may be periodically assessed to inform the size of the limited data storage capacity suitable for achieving a target level of adoption among users. As users become more comfortable with the recording of conversations via their client devices, the data storage capacity may be increased and/or the quality of the recorded audio may be reduced to broaden the temporal scope of the conversations that are recorded and/or analyzed for keywords.

Returning to FIG. 1, a user 112 initiates construction of a search query by typing the keyword "hotels" into a user interface 138 of client device 120. An example graphical user interface (GUI) 150 of a search program 132 is depicted in FIG. 1. GUI 150 includes a search field that enables a user to direct a search query to a search engine. Search program 132 includes any suitable program or interface that enables the user to access the search engine. The search engine may reside on-board client device 120, and may form part of search program 132, or may reside at a remote server system such as server system 170 that is accessible to client device 120 via communications network 160. For example, in FIG. 1, server system 170 includes a search engine 180. As one example, search program 132 may include or take the form of a general-purpose web browser, and GUI 150 may include a webpage (e.g., the GOOGLE brand search engine accessible at www.google.com). As another example, search program 132 may include or take the form of a special-purpose application program, such as a program used for performing searches on-board the client device or at a server system or other computing device external the client device. As yet another example, search program 132 may include or take the form of an operating system of client device 120 or a portion thereof. Hence, it will be understood that the search engine may form part of search program 132, which may in turn form part of the operating system.

Within example GUI 150, the keyword "hotels" forms part of a user-defined portion of a search query constructed by the user. One or more additional keywords (e.g., "new york" forming an expanded portion of the search query may be obtained from the audio information recorded prior to the user initiating construction of the search query. The keyword "hotels" is bolded in FIG. 1 to distinguish the user-defined portion from the keywords "new york" of the expanded portion. In practice, these keywords may not be visually distinguished from each other when presented to the user. However, in some implementations, these keywords may be visually distinguished from each other when presented to the user by any suitable attribute, including, for example, bolding, italics, underline, font type, font size, color, and/or order presented, among other suitable distinguishing attributes or features.

The search query including the user-defined portion and the expanded portion is supplied to a search engine. A response to the search query is received from the search engine. The response is generated by the search engine based, at least in part, on the one or more keywords of the user-defined portion and the one or more additional keywords of the expanded portion of the search query. For example, in FIG. 1, example GUI 150 includes an ordered list of search results forming hyperlinks to network resources for the search query "hotels new york". In other examples, search results may include other forms of network resources, such as photos, videos, audio files, map locations, etc. GUI 150 may alternatively or additionally include an ordered list of recommended search results for the search query. A user may navigate to one or more of these search results or recommended search queries by selecting a corresponding hyperlink.

The processing of audio information to obtain the keywords of the expanded portion of the search query may be performed on-board the client device and/or may be performed at a remote server system, such as server system 170. For example, audio module 184 depicted at server system 170 may be configured to apply speech recognition techniques to audio information to obtain keywords. Audio module 184 may instead reside at client device 120, and may form part of search program 132 and/or a search engine portion of search program 132. The expanded search query techniques described herein may reside entirely on-board the client devices, for example, if the search engine resides on-board client device, and if keywords are extracted from the audio information on-board the client device. If the search engine resides on-board the client device, and if the audio information is processed at a server system to extract the keywords, then the keywords may be returned to the client device for use by the search engine. If the search engine resides at the server system, and if the audio information is processed at the server system to extract the keywords, then the user-defined portion of the search query may be transmitted to the server system along with at least a portion of the audio information for further processing. If the search engine resides at the server system, and if the audio information is processed on-board the client device to extract the keywords, then the user-defined portion of the search query may be transmitted to the server system along with one or more additional keywords defining the expanded portion extracted from the audio information for use by the search engine.

Client device 120 may include or take the form of a computing device or other suitable electronic device, such as a desktop computer, a laptop computer, a mobile handheld computing device, a mobile communications device, a media player device, a gaming system or gaming console device, etc. Client device 120 includes logic subsystem 122 to execute instructions 130 held in storage subsystem 124. Logic subsystem 122 may include or take the form of one or more processors, logic machines, or other suitable logic elements. Instructions 130 may include or take the form of software and/or firmware, and may be implemented as an application program, an operating system, a plug-in, a software component, etc., a combination thereof, or a portion thereof. Client device 120 may include a communication interface 134 enabling wired and/or wireless communication over any suitable communications protocol with one or more other computing devices, such as server system 170 via a communications network 160. Communications network 160 may include one or more wide area networks (e.g., the Internet), local area networks (e.g., the Intranet), and/or personal area networks. Client device 120 may include or may interface with one or more input and/or output devices 136 forming a user interface. Non-limiting examples of input and/or output devices including graphical display devices, touch-sensitive graphical display devices, image projectors, optical sensors, microphone 140, keyboards, keypads, pointing devices such as a computer mouse, handheld controllers, audio speakers, etc.

Server system 170 includes one or more computing devices, such as one or more server devices. Such server devices may be co-located or may be geographically distributed, and may communicate with each other over communications network 160. Server system 170 collectively includes a logic subsystem 172 to execute instructions 178 held in storage subsystem 174. Logic subsystem 172 may include or take the form of one or more processors, logic machines, or other suitable logic elements. Instructions 178 may include or take the form of software and/or firmware, and may be implemented as an application program, an operating system, a plug-in, a software component, etc., a combination thereof, or a portion thereof. Instructions 178 is depicted as including one or more functional modules, such as search engine 180, expansion module 182, and audio module 184. Expansion module 182 may be configured to receive, identify, process, and/or filter one or more keywords forming an expanded portion of a search query for use by search engine 180. Expansion module 182 may form part of search engine 180 in some examples. One or more of these modules may instead reside at client device 120, and may form part of search program 132. Storage subsystem 174 further includes a data store 176, which may include indexed search query/search result combinations that may be used by search engine 180 to return a response to a search query. Data store 176 may instead form part of data store 126 residing at client device 120.

Figure 2:
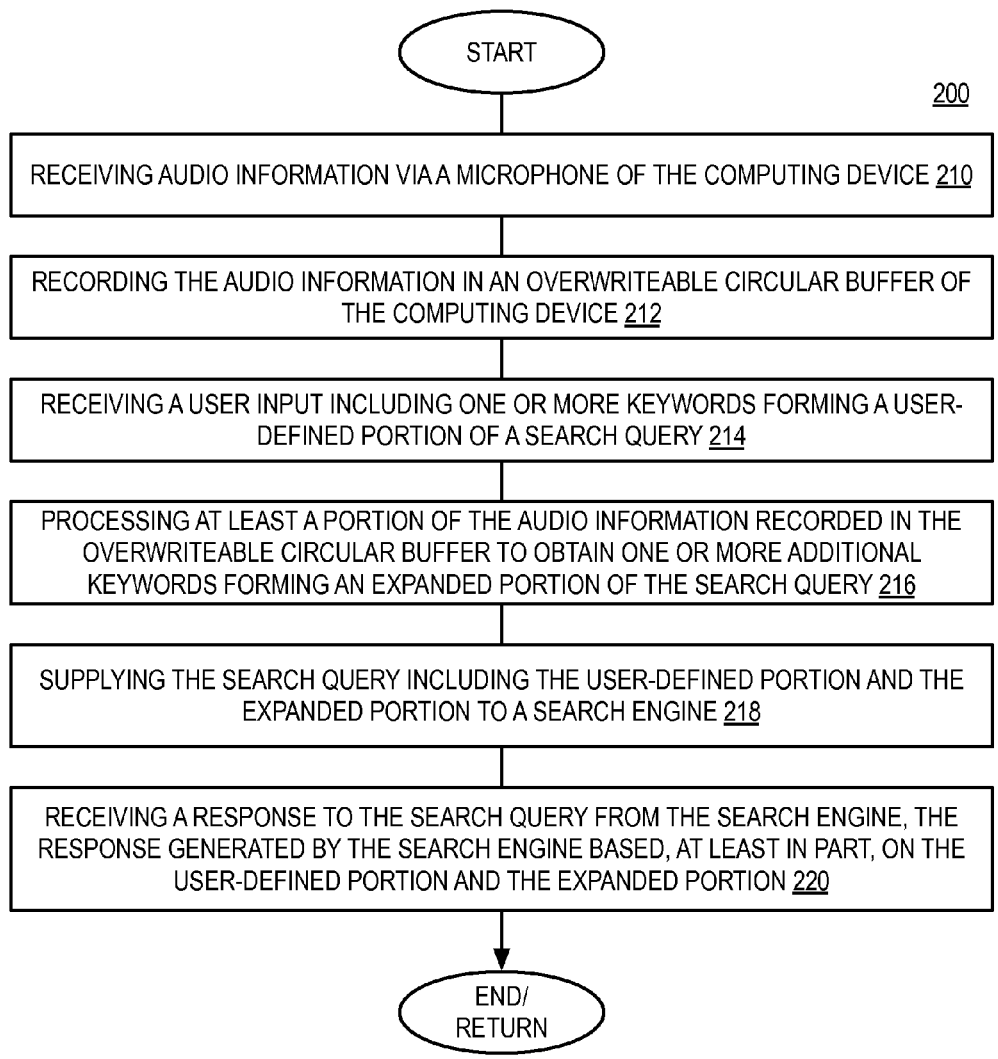
FIG. 2 is a flow diagram depicting an example method for constructing an expanded search query according to one implementation.

FIG. 2 is a flow diagram depicting an example method 200 for constructing an expanded search query according to one implementation. As one example, method 200 or portions thereof may be performed by one or more computing devices, such as previously described client device 120 and/or server system 170 of FIG. 1.

At 210, the method may include receiving audio information via a microphone of a computing device. The computing device may include or take the form of a client device, such as client device 120. The audio information may include audible spoken language of one, two, three, or more persons physically present at or near the location of the computing device. Such persons may include a user of the computing device or persons speaking with or nearby the user of the computing device.

At 212, the method may include recording the audio information in an overwriteable circular buffer of the computing device. The overwriteable circular buffer may have a limited data storage capacity in which older audio information is overwritten with newer audio information upon reaching the limited data storage capacity. While method 200 is described in the context of an overwriteable circular buffer, method 200 may be applicable to other forms of data storage beyond an overwriteable circular buffer.

In at least some implementations, recording of audio information may be initiated responsive to a triggering condition. As one example, a triggering condition may include detection of a sound level via the microphone that exceeds a sound level threshold. Other examples of triggering conditions will be presented below.

Recording audio information in the overwriteable circular buffer or other suitable form of data storage may include continuously recording the audio information by overwriting the oldest audio information with the newest audio information upon reaching the limited data storage capacity. In some scenarios, continuously recording the audio information may include sampling the audio information at a defined sampling rate sufficient to enable extraction of keywords from the audio information.

In at least some implementations, the recording of audio information in the overwriteable circular buffer or other suitable form of data storage may include recording at least some of the audio information during a period when or while the computing device is powered-on, but is in an inactive state or a sleep state in which a graphical display of the computing device is off or substantially dimmed. In another implementation, the recording of audio information in the overwriteable circular buffer or other suitable form of data storage may include recording at least some of the audio information during a period when or while the user is using or operating the computing device, but the search program is not the current focus application of the computing device or the search program is running as a background process or the search program has not yet been launched at the computing device.

The storage of audio information may include the storage of the raw audio information and/or the storage of a processed version of the audio information received via the microphone. As one example, the audio information received via the microphone may be compressed, digitized, encoded, encrypted, and/or down-sampled at the computing device prior to storage and/or after storage but prior to transmission over a communications network. Additionally or alternatively, the audio information may be processed as subsequently described at 218, for example, to extract keywords from the audio information. These keywords may be stored (e.g., at the circular buffer or other form of data storage) in place of or in addition to the audio information or other processed components thereof.

At 214, the method may include initiating construction of a search query by receiving a user input via a text-based user interface of the computing device. The user input may include one or more keywords forming a user-defined portion of a search query. Hence, in at least some implementations, construction of the search query is initiated by the user.

Alternatively or additionally, the method at 214 may include receiving one or more keywords verbally spoken by a user. These keywords differ from the pre-recorded keywords in that the user is manually providing and is intentionally defining this keyword information for the purpose of formulating or constructing the search query. By contrast, the pre-recorded audio information was obtained while the user or other persons were speaking for the purpose of communicating with each other prior to construction of the search query. These communications were not directed at a search program or search engine at that time, and were not formatted for precisely defining a search query. Rather, the pre-recorded audio may or may not contain keywords of relevance to the search query. Hence, such pre-recorded audio should not typically be used to form the basis of the search query, but rather may be used to augment the user-defined keywords to expand the search query to one or more sub-domains. As will be described in greater detail, different rules may be applied by the search engine to keywords derived from pre-recorded audio information as compared to user-defined keywords.

At 216, the method may include processing at least a portion of the audio information recorded in the overwriteable circular buffer to obtain one or more additional keywords forming an expanded portion of the search query. Processing the portion of the audio information may include applying speech recognition to the portion of the audio information to obtain the one or more additional keywords.

The portion of the audio information containing the one or more additional keywords may be received and recorded in the overwriteable circular buffer prior to receiving the user input including the one or more keywords. Processing the portion of the audio information to obtain the one or more additional keywords forming the expanded portion of the search query may be performed at a remote server system in at least some examples. The method may include transmitting the portion of the audio information to the remote server system via the communications network for processing.

Processing the portion of the audio information may be performed at the computing device or remotely at a server system responsive to a triggering condition. A triggering condition may include one or more of (1) a waking of the computing device from an inactive state or a sleep state in which a graphical display of the computing device is off or substantially dimmed to an active state or a non-sleep state in which the graphical display of the computing device is on or substantially brightened, (2) a user initiating construction of the search query by providing a first text character of the user input that defines a first keyword of the one or more keywords forming the user-defined portion of the search query, (3) a user initiating construction of the search query by providing the first keyword of the user input of the one or more keywords forming the user-defined portion of the search query, (4) a user launching a search interface of an application program or an operating system at the computing device, (5) a user bringing a search program or search interface into focus at the computing device, among other suitable conditions.

At 218, the method may include supplying the search query including the user-defined portion and the expanded portion to a search engine. Supplying the search query to search engine may include transmitting the search query to a remote server system via a communications network. As one example, the portion of the audio information may be transmitted to the remote server system as a separate message from a message including the user-defined portion of the search query. As another example, the portion of the audio information may be transmitted to the remote server system as part of the same message or set of messages that include the user-defined portion of the search query. As previously described, the search engine may reside on-board the computing device. It will be understood that the search engine may form a separate program from the audio module or expansion module used to record audio information and extract keywords. Some of these programs and/or processes may run independent of each other to enable recording and/or processing of audio information while the search engine and/or search program or interface are not in operation or are not in focus.

In at least some implementations, the one or more keywords of the user-defined portion may define an initial search domain, and the one or more additional keywords of the expanded portion may define one or more sub-domains within the initial search domain. For example, where the user-defined portion includes the keywords "hotels", the one or more additional keywords may be used by the search engine to provide search results or recommended search queries for sub-domains of the domain "hotels". Different weightings may be applied to keywords depending on whether they form part of the user-defined portion or the expanded portion. Typically, the user-defined portion will be weighted to more heavily influence the search results and/or recommended search queries that are returned as compared to the expanded portion.

At 220, the method may include receiving a response to the search query from the search engine. The response may be generated by the search engine based, at least in part, on the one or more keywords of the user-defined portion and the one or more additional keywords of the expanded portion of the search query. Receiving the response to the search query may include receiving the response to the search query via the communications network originating from the remote server system. The response to the search query may be presented at the computing device as a set of search results and/or as a set of recommended search queries depending on implementation.

In some examples, method 200 may further include processing at least another portion of the audio information to obtain one or more other keywords. This portion of the audio information may have been recorded in the overwriteable circular buffer after construction of the search query has been initiated, including during and/or after construction of the search query. The search query supplied to the search engine may further include these other keywords. The response received from the search engine may include the one or more search results that were generated by the search engine further based, at least in part, on these one or more other keywords.

As previously described, one or more of the reception, recording, and/or processing of the audio information, such as at 210, 212, and 216 may be performed responsive to one or more triggering conditions. Triggering conditions may be used to limit or reduce the amount of energy used by the computing device to monitor, record, and process audio information, and may be used to limit the extraction of keywords from such audio information for the benefit of added privacy and security.

A triggering condition may include the occurrence and detection of an audible event having a threshold decibel level and/or the audible event having a frequency within a defined frequency range. A triggering condition may include the occurrence and detection of a movement of client device 120 having a threshold intensity and/or movement signature, such as may be detected via an inertial sensor, gyroscope, or other suitable motion sensor on-board the client device. Another triggering condition may include the occurrence and detection of a lighting condition and/or a proximity condition having a threshold intensity, a threshold proximity, or a defined optical signature as may be detected via an optical sensor on-board the client device. Another triggering condition may include the occurrence and detection of an application program of the client device being launched by a user or being switch from a non-focus application state to a focus application state by the user. Another triggering condition may include a user waking the computing device from a sleep state or the user turning on or power-on the computing device. Another triggering condition may include a user depressing a physical button on the computing device or on an input device in communication with the computing device. Another triggering condition may include the computing device issuing an alert or notification, such as an incoming communication (call, text, email, etc.), an alarm, an application program notification or alert, an operating system notification or alert, etc. Another triggering condition may include a user selecting a search field of a search program, or the user beginning to type in the search field or program, or the user initiating transmission of the search query to a search engine.

It will be understood that a combination of one or more of these and other triggering conditions may be used for one or more of the reception, recording, and processing of audio information. Furthermore, some or all of the reception, recording, and processing processes performed at 210, 212, and 216 may be performed responsive to a different triggering condition or a different combination of triggering conditions from the other of these processes. As one example, the reception and recording of audio information may be performed responsive to a user waking the computing device from a sleep state, while the processing of the audio information may be performed responsive to a user launching a search program. As another example, background audio may be continuously or periodically monitored by the computing device while the computing device is powered-on to receive audio information, audio information may be recorded responsive to the background audio exceeding a threshold decibel level, and the processing of audio information may be performed responsive to a user waking the computing device from a sleep state. It will be understood that these merely non-limiting examples of the various combinations and sub-combinations of triggering conditions that may be constructed to control operation of the computing device.

Figure 3:
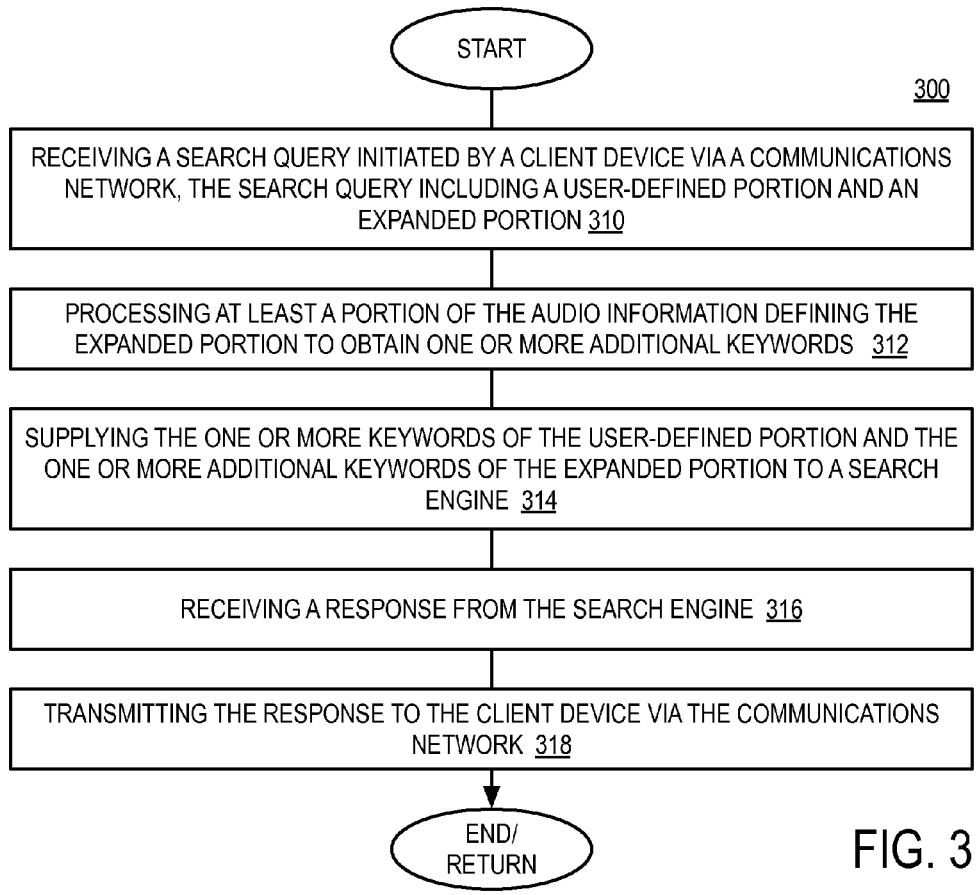
FIG. 3 is a flow diagram depicting an example method of processing an expanded search query according to one implementation.

FIG. 3 is a flow diagram depicting an example method 300 for processing an expanded search query according to one implementation. As one example, method 300 may be performed by a server system, such as previously described server system 170 of FIG. 1. However, method 300 may be performed entirely on-board an individual client device in other implementations.

At 310, the method may include receiving a search query initiated by a client device via a communications network. The search query may include a user-defined portion having one or more keywords supplied by a user via a text-based user interface of the client device, and an expanded portion defined by audio information recorded at the client device prior to initiating construction of the search query with the user-defined portion. Alternatively, the user-defined portion may include one or more keywords supplied by the user in spoken form for the purpose of constructing the search query.

Different rules and/or processing techniques may be applied to keywords contained within the user-defined portion of the search query as compared to the expanded portion of the search query. Keywords that originated from the pre-recorded audio information may be distinguished from user-defined keywords due, in part, to the greater level of confidence and/or relevancy associated with the user-defined portion as compared to the expanded portion. For example, the keywords of the user-defined portion have been expressly and intentionally provided by that user for the purpose of constructing and defining the search query. By contrast, pre-recorded audio information may contain a large number of irrelevant keywords, which are not intended to form part of the search query. As one example, keywords originating from the pre-recorded audio information may be assigned a lesser or different weight toward influencing the search results or recommended search queries returned by the search engine as compared to the user-defined keywords. It will be appreciated that any suitable weighting or processing may be performed based on search query information obtained from both manual input/selection and audio sources. Such weightings may accompany the transmission of keywords forming a search query, and/or may be assigned prior to submission to a search engine (e.g., by an expansion module).

At 312, the method may include processing at least a portion of the audio information defining the expanded portion of the search query to obtain one or more additional keywords contained within the audio information. As previously described with reference to process 216, keywords may be obtained from audio information using speech recognition techniques.

At 314, the method may include supplying the one or more keywords of the user-defined portion and the one or more additional keywords obtained from the expanded portion to a search engine. In at least some implementations, the server system may associate one or more of the expanded portion and/or the user-defined portion of the search query with a distinguishing identifier that enables the search engine to distinguish the one or more keywords of the expanded portion from the one or more keywords of the user-defined portion. As one example, the keywords may be associated with an identifier (e.g., 1=user-defined, 0=expanded). As another example, the keywords may be associated with different weightings (e.g., 0.9 for user-defined, 0.1 for expanded).

At 316, the method may include receiving a response from the search engine. The response may include one or more search results and/or one or more recommended search queries generated by the search engine based, at least in part, on the one or more keywords of the user-defined portion and the one or more additional keywords obtained from the expanded portion. The search engine may apply different rules to user-defined keywords as compared to expanded keywords. The different rules may be applied by the search engine responsive to the distinguishing identifiers associated with each set of keywords, such as different weightings, for example.

At 318, the method may include transmitting the response to the client device via the communications network for presentation. The client device receives the response, and presents the search results and/or recommend search queries via a graphical user interface or other suitable output device. Hence, the search results and/or recommended search queries, and their respective ordering that are presented to the user may be at least partially influenced by pre-recorded audio information obtained prior to construction of the search query by the user.

Figure 4:
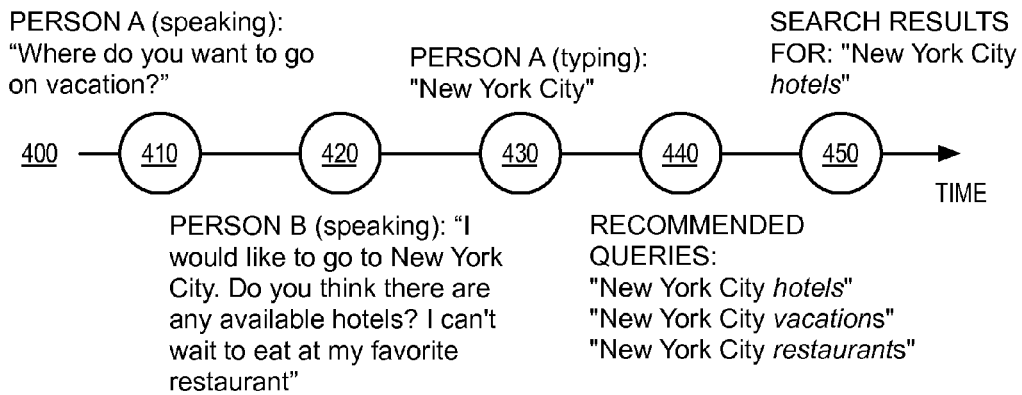
FIG. 4 is a timeline depicting an example use-scenario according to one implementation.

FIG. 4 is a timeline 400 depicting an example use-scenario according to one implementation. At 410, a first person (e.g., PERSON A) inquires by speaking to a second person (PERSON B): "Where do you want to go on vacation?" At 410, the second person replies by speaking to the first person: "I would like to go to New York City. Do you think there are any available hotels? I can't wait to eat at my favorite restaurant". Up to this point in time, the computing device carried by the first person has been in a sleep state or has been operated with focus on an application program or other interface that is other than a search program or search interface for accessing a search engine. At 430, the first person types the keywords "New York City" into a search field forming part of a webpage presented by a browser program operating on a computing device. For example, the first person may wake the computing device from the sleep state, or may bring a search program or search interface such as the webpage of the browser into focus. At 440, recommended queries are optionally presented that include the keywords manually entered by the first person that form part of the user-defined portion of the search query, and further includes expanded keywords obtained from the previous spoken conversation recorded between the first person and the second person. At 450, search results for the combined search query "New York City hotels" are returned to the computing device by the search engine where the search results are presented by the browser program via a webpage.

The network-based search techniques described herein may be alternatively of additionally performed locally at an individual computing device without requiring access to a communications network. For example, the various functional components of computing system 100 may reside on-board a stationary or mobile computing device operated by a user.

Figure 5:
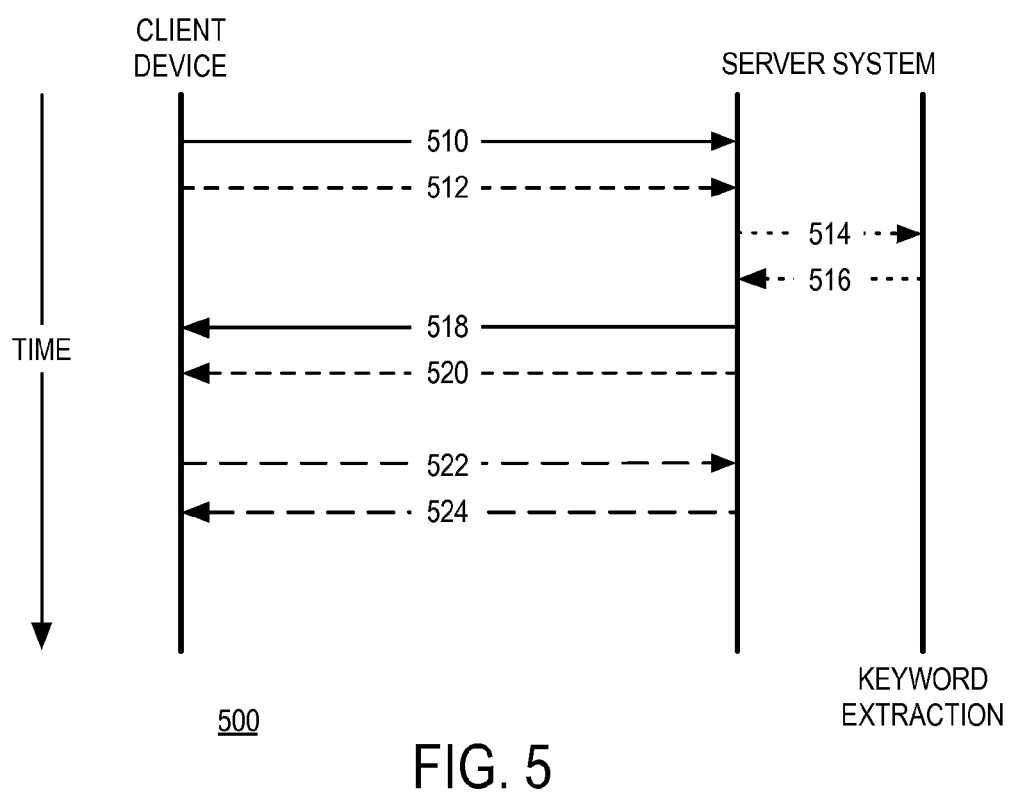
FIG. 5 is a flow diagram depicting an example interaction between a client device and a server system according to one implementation.

FIG. 5 is a flow diagram depicting an example interaction 500 between a client device and a server system according to one implementation. The client device transmits a search query to the server system as one or more messages 510. One or more messages 510 may include a user-defined portion and an expanded portion as previously described. Alternatively, one or more messages 510 may include the user-defined portion or the expanded portion, and one or more messages 512 may include the other of the user-defined portion or the expanded portion. One or more messages 510 may be transmitted by the client device at the same time or at a different time than one or more messages 512.

The server system receives the search query as one or more messages 510 and/or one or more messages 512. If audio information is contained in the search query, the audio information may be passed at 514 to an audio module for keyword extraction to obtain one or more keywords 516 contained within the audio information.

If the user-defined portion of the search query received by the server system is in the form of a spoken search query and the expanded portion of the search query received by the server system is in the form of pre-recorded audio information, then the server system may apply different rules and/or filters to each form of audio information and the keywords extracted from such audio information. For example, keywords obtained from pre-recorded audio information of the expanded portion may be indicated as such to the search engine or other functional entities, and keywords obtained from a user-defined portion of a spoken search query may be indicated as such to the search engine or other functional entities. Keywords from different sources of audio information may be distinguished from each other at the server system, and different weights, priorities, etc. may be applied to keywords from different sources at the server system. For example, user-defined keywords may be weighted more heavily toward influencing the search results or recommended search queries relative to keywords contained in the expanded portion of the search query, particularly since keywords contained in the expanded portion may be numerous or may be associated with greater uncertainty as to whether the user intended those keywords to form part of a search query.

The search query is processed by the server system, and a response is transmitted by the server system to the client device as one or more messages 518. The response may include one or more recommended search queries and/or one or more search results responsive to the search query. Alternatively, one or more messages 518 may include one or more recommended search queries or one or more search results, and one or more messages 520 may include the other of the one or more recommended search results or one or more search queries. One or more messages 518 may be transmitted by the server system at the same time or at a different time than one or more messages 518.

The client device receives the response as one or more messages 518 and/or 520, which may be presented at the client device to a user. If the user selects a search result, then one or more messages 522 may be transmitted by the client device to the server system or to some other network location for retrieval of a network resource as indicated as one or more messages 524. A network resource may include a website, a content item (e.g., picture, video, song, etc.), a map, or other suitable information. If the user selects a recommended search query, then one or more messages 522 may be transmitted by the client device to the server system for the search results corresponding to the recommended search query. The server system processes the recommended search query, and responds with search results as indicated by one or more messages 524.

For implementations where the search query is processed entirely on-board the client device, the functional entity identified as the server system in FIG. 5 may take the form of a software module of the client device, and the functional entity identified as the client device in FIG. 5 may take the form of a search interface presented at the client device. For implementations where the search query is processed on-board the client device with the exception of keyword extraction from audio information, the functional entity identified as keyword extraction may take the form of a server system, and the forward plane of the server system within FIG. 5 may take the form of a software module of the client device.

Figure 6:
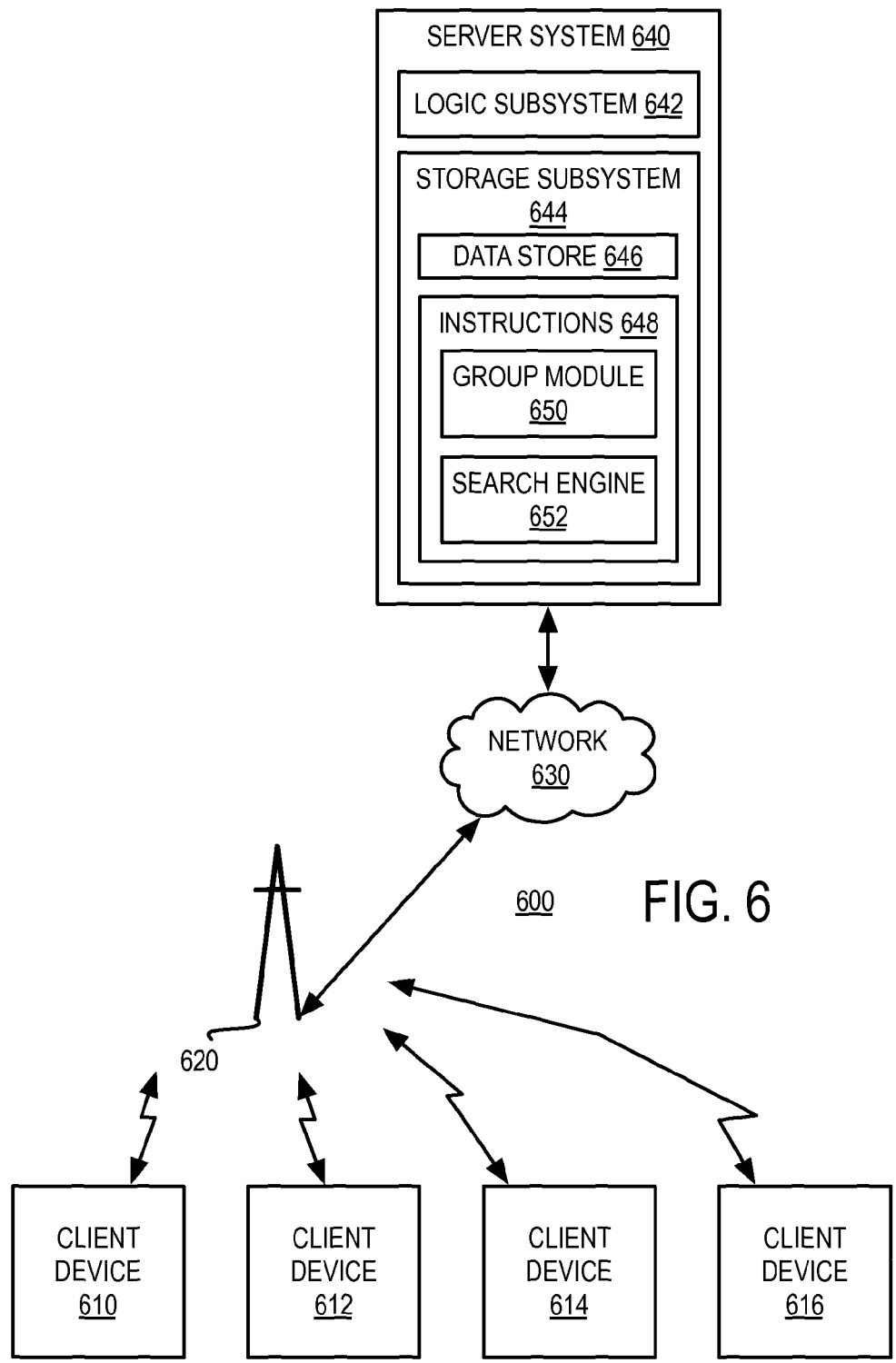
FIG. 6 is a schematic diagram depicting an example computing system according to one implementation.

FIG. 6 is a schematic diagram depicting an example computing system 600 according to one implementation. Within computing system 600, client devices 610, 612, 614, 616, etc. are accessing a communications network 630 via one or more access points, such as example access point 620. Access point 620 may support wired and/or wireless communications with client devices via any suitable protocol. One or more of client devices 610-616 may alternatively or additionally access communications network 630 via a different access point (not shown) as compared to others of client devices 610-616.

A server system 640 in communication with communications network 630 may receive, process, and respond to search queries initiated by client devices. Such responses may include search results and/or recommended search queries to facilitate further searching. Server system 640 may include a logic subsystem 642 to execute instructions, and a storage subsystem 644 having a data store 646 and instructions 648 stored thereon. Instructions 648 may include a search engine 652 to receive search queries and respond with search results, and a group module 650 to identify user groups and augment search queries and/or search results as will be described in further detail with reference to method 700 of FIG. 7. While group module 650 is depicted separately from search engine 652 in FIG. 6, it will be understood that these functional entities may be combined into a single functional entity or group of functional entities (e.g., an enhanced search engine) in some examples. Data store 646 may include indexed information that may be used by the search engine to generate responses to input search queries. Data store 646 may additionally include lists of user groups and/or search settings as will be described in further detail with reference to FIGS. 7-10. Server system 640 may include one or more server devices. Data store 646, group module 650, and/or search engine 652 may reside at different server devices of server system 640 in some examples.

Figure 7:
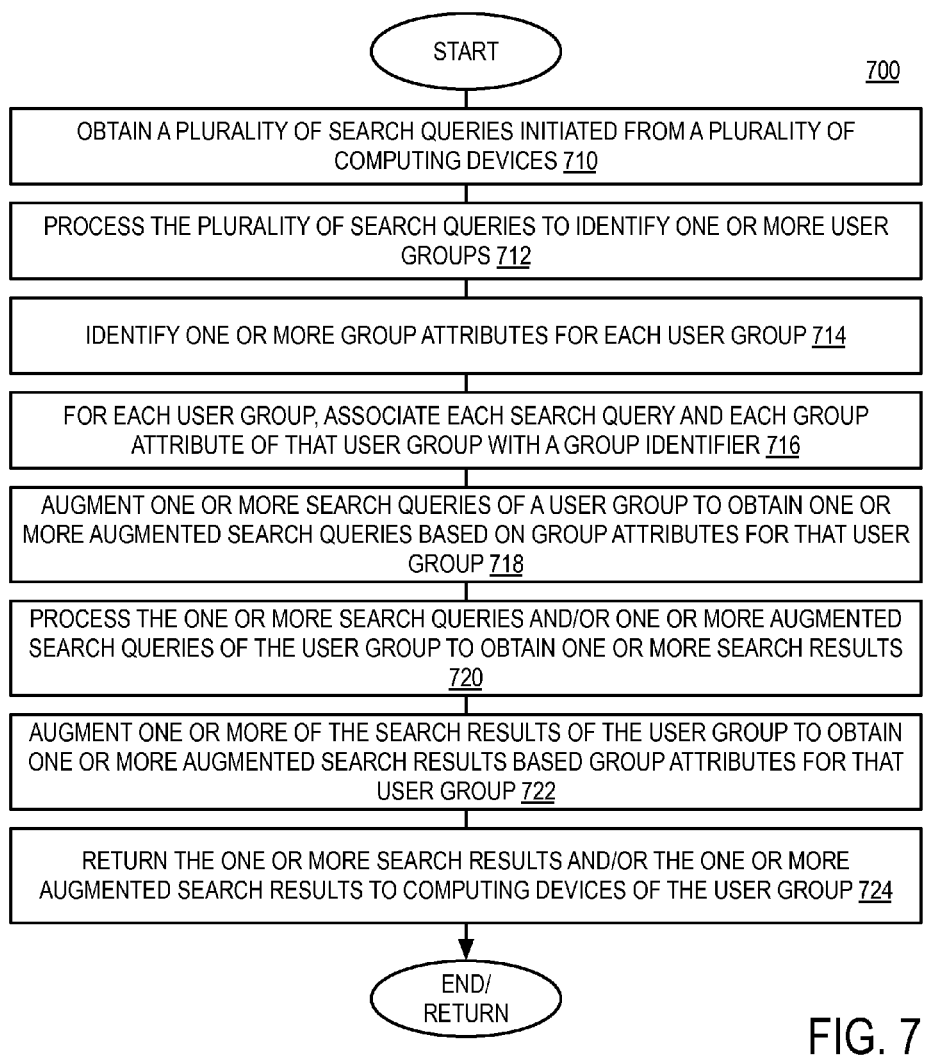
FIG. 7 is a flow diagram depicting an example method for group search according to one implementation.

FIG. 7 is a flow diagram depicting an example method 700 for group search according to one implementation. As one example, method 700 may be implemented or performed by a server system, such as previously described server system 640 of FIG. 6. In this context, method 700 may describe a server system responding to search queries received over a communications network from a plurality of client devices operated by respective users.

At 710, the method may include obtaining a plurality of search queries initiated from a plurality of computing devices. For example, these computing devices may take the form of client devices through which users submit search queries in the form of text-based and/or voice-based search terms (e.g., keywords). One or more of these computing devices may be accessing a communications network via a common access point, and one or more of these computing devices may be accessing the same communications network or a different communications network via a different access point. For example, some computing devices may obtain network connectivity over a public wireless network via a wireless 3G/4G base station, and some computing devices may obtain network connectivity over a private wireless network via a wireless Wi-Fi router. Various other use-scenarios may exist as the preceding example is to be considered non-limiting.

At 712, the method may include processing the plurality of search queries to identify one or more user groups. Such processing may be performed by previously described group module 650 executed by a logic subsystem of a server system, for example. User groups may be formed based on one or more of the following factors: (1) a time proximity between initiation and/or reception of two or more search queries, (2) a geographic proximity between two or more computing devices initiating the two or more search queries, (3) a network access point proximity (e.g., the same access point or a different access point) between the two or more computing devices initiating the two or more search queries, (4) a search query content relatedness between the two or more search queries, (5) a social proximity between two or more users associated with the two or more computing devices, (6) historic group membership of the two or more users and/or the two or more computing devices.

As one example, a user group may be formed for two or more users/computing devices that (1) initiate search queries within a threshold time proximity to each other (e.g., 5 seconds, 10 seconds, 30 seconds, 1 minute, 5 minutes, 10 minutes, 1 hour, etc.), and either (2) are located within a threshold geographic proximity to each other (e.g., 5 ft., 20 ft., 100 ft., 1 mile, etc. as identified from GPS/geo-location information) or (3) are accessing a communications network via the same access point or two overlapping access points, and (4) the two or more search queries have at least a threshold relatedness between each other. This example is to be considered non-limiting as a different combination of factors and/or threshold values may be used. As will be described in further detail with reference to FIG. 8, these factors and/or thresholds may be at least partially defined by users in the form of search settings.

A relatedness between search queries may be identified by comparing keywords between the search queries. Any suitable technique for identifying relatedness between or among two or more search queries may be used. As one example, root forms of words forming keywords of a search query and their synonyms may be used for purposes of comparison. As a non-limiting example, the keywords "hotel" and "hotels" may be identified as having a higher relatedness as compared to the keywords "hotel" and "skydiving". As another example, a search query "hotels in new york city" may be identified as having a higher relatedness if compared to a search query "hotels in new york" than if compared to "hotels in boston". Search queries that are identical to each other or substantially identical to each other may be identified as having perfect relatedness or the highest relatedness.

Keyword weighting may be applied to identify relatedness. For example, a search query "car rentals in new york" may be identified as having a higher relatedness if compared to a search query "hotels in new york" than if compared to "car rentals in boston" if, for example, the keywords "new york" are weighted more heavily for relatedness than the keywords "car rentals". It will be understood that any suitable form of search query comparison, matching, scoring, etc. may be used to identify relatedness between two or more search queries for the purpose of user group formation. Relatedness may be determined by the group module, or may be determined by the search engine, which may communicate the relatedness of two search queries to the group module.

Geographic proximity may be identified in some implementations by (1) the computing devices sending their geographic location to the server system, and/or (2) by the geographic location being reported to the server system from one or more access points and/or (3) a geographic location determination service of the communications network. It will be understood that any suitable technique may be used to obtain geographic location of computing devices.

In some examples, initiation of search queries may be time-stamped, with the time-stamp accompanying the search query received at the server system. In some examples, reception of a search query may be time-stamped by the server system or by network nodes of the communications network and/or access points. Time-stamps may be compared to determine time proximity between two or more search queries.

In at least some implementations, search queries received by the server system may include network path identifying information, such as an identifier of an access point by which the search query was received from the computing device. The server system may access a directory of access points to determine whether a threshold level of access point proximity has been achieved between two or more access points based, for example, on access point identifiers. Access point identifiers may be correlated with geographic location using a directory, and may be used to access whether two or more access points have an overlapping serve area, for example.

The processing performed at 712 may be used to exclude some search queries from a user group while admitting other search queries to the user group. For example, search queries that were initiated or received outside of a threshold time proximity to an average initiation or reception time for other search queries of a user group may be excluded from the user group. As another example, search queries that were received via a different access point or an access point that is sufficiently geographically remote from an access point by which other search queries of a user group were received may be excluded from that user group. As yet another example, search queries that are received at the same time via the same access point as other search queries of a user group may be excluded from that user group if those search queries are sufficiently unrelated to the other search queries of the user group. It will be understood that these examples should be considered non-limiting as other suitable filters or thresholds may be applied to identifying user groups depending on implementation.

A non-limiting example of a narrow definition of a user group that may be suitable for the group search techniques described herein may require that search queries be received via the exact same access point within 15 seconds of each other containing at least one identical keyword or at least two non-identical but related keywords.

Social relatedness among users may be identified based on prior communications between users and/or from relationship information obtained from a social networking platform. Such information may be provided to server system 640 via a programming interface supported by another server system hosting the communications platform and/or social networking platform. Alternatively or additionally, server system 640 may itself host communications and/or a social networking platform for its users. Users that have previously communicated with each other (e.g., via email, telephone, SMS, etc.) or have a "friend" type relationship status with each other may be identified as having a higher social relatedness as compared to users that have not communicated with each other or are not sufficiently linked in proximity to each other within a social networking platform.

Historic group membership of users and/or computing devices operated by such users may be identified by server system 640 from information stored at data store 646. For example, server system 640 may log group membership records for each group identified by the server system for the purpose of enabling subsequent detection of user groups based on historical information.

At 714, the method may include identifying one or more group attributes for each user group. Group attributes may include values associated with one or more of the previously described factors for identifying group membership, including values for each user and/or between users for (1) a time proximity between initiation and/or reception of two or more search queries, (2) a geographic proximity between two or more computing devices initiating the two or more search queries, (3) a network access point proximity (e.g., the same access point or a different access point) between the two or more computing devices initiating the two or more search queries, (4) a search query content relatedness between the two or more search queries, (5) a social proximity between two or more users associated with the two or more computing devices, (6) historic group membership of the two or more users and/or the two or more computing devices.

The one or more group attributes may alternatively or additionally include search settings of users from which search queries have been received. For example, a user profile may be identified for each user based on user login credentials, client device identifiers, software identifiers, hardware identifiers, etc. enabling retrieval of the search settings for each user from their respective user profile. Such search settings may be assigned a default value if that user has not defined some or all of the search settings.

At 716, the method may include, for each user group, associating each search query and each group attribute of that user group with a group identifier and/or a user identifier. For example, the server system may associate the group identifier with user identifiers for users that are members of the group in a database of data store 646, along with search queries received from users of the group and/or group attributes for those users.

As a non-limiting example, a database entry may include: GROUP_ID_123: USER_ID_A: SEARCH_QUERY_ID_A: KEYWORD_VALUE_A, KEYWORD_VALUE_B, PARAMETER_ID_A: ATTRIBUTE_VALUE_1, PARAMETER_ID_B: ATTRIBUTE_VALUE_2, PARAMETER_ID_C: ATTRIBUTE_VALUE_3, USER_ID_B: SEARCH_QUERY_ID_B: KEYWORD_VALUE_A, KEYWORD_VALUE_C, PARAMETER_ID_A: ATTRIBUTE_VALUE_4, PARAMETER_ID_B: ATTRIBUTE_VALUE_2, PARAMETER_ID_C: ATTRIBUTE_VALUE_5.

At 718, the method may include augmenting or otherwise modifying one or more search queries of a user group to obtain one or more augmented search queries based, at least in part, on one or more group attributes for that user group. Search query augmentation may include increasing the diversity between two or more search queries of a user group to reduce search query relatedness or harmony, blending the two or more search queries of a user group, and/or harmonizing the two or more search queries of the user group to increase search query relatedness or reduce diversity. The method at 718 may be performed by the group module in some implementations, or may be performed by the search engine prior to processing the search query and/or augmented search query to obtain a search query response.

As one example, for two identical search queries of a user group that include the keywords "hotels in new york", diversity may be increased for at least one search query by removing one or more keywords (e.g., "hotels") and/or by adding one or more keywords (e.g., "hotels in new york city"). As another example, for two different search queries of a user group, such as (1) "cheap hotels in new york" and (2) "new york city hotel", diversity may be reduced by augmenting one or more of the search queries to a harmonized or blended version, such as "cheap new york city hotels".

At 720, the method may include processing the one or more search queries and/or one or more augmented search queries of the user group to obtain one or more search results. The original search queries of a user group and/or the augmented search queries of the user group may be supplied to a search engine or a portion of the search query that is configured to provide search results responsive to input queries.

At 722, the method may include augmenting the one or more search results of the user group to obtain one or more augmented search results based, at least in part, on one or more group attributes for that user group. While the process at 724 is described in terms of search results, any content of a response to a search query may be augmented or otherwise modified, including recommended search queries contained within the response. The method at 722 may be performed by the group module receiving the response from the search engine and/or may be performed by the search engine prior to issuing the response.

At 724, the method may include returning the response such as one or more search results (and/or recommended search queries) and/or the one or more augmented search results (and/or augmented recommended search queries) to the computing devices of the user group. While the flow diagram of FIG. 7 depicts processes performed in a particular order, this order may be differ in some implementations and certain processes may at times be performed in parallel, repeated, or omitted. For example, the first search query for a user group that is received by the server system may be processed by returning a response prior to receiving a second search query for that user group. In such cases, a response to the first search query may not be augmented, modified, or influenced by the second subsequent search query. However, the response to the second search query may be influenced by the first search query depending on the extent to which group search is implemented.

FIG. 8 is a schematic diagram depicting an example user interface 800 of a computing device according to one implementation. As one example, user interface 800 may take the form of a graphical user interface displayed or otherwise presented by a client device. User interface 800 includes a number of search settings. Each search setting may have one or more respective control elements (e.g., selectors) that enable a user to control, adjust, set, or otherwise define a value or state for that search setting. These search settings may be implemented at a client device and/or may be communicated by the client device to a server system where they may be implemented to influence the search results and/or recommended search queries of responses that are returned to one or more users of a group. Modification of search queries may take the form of keyword replacement, subtraction, addition, or an increase or decrease to the weighting of one or more keywords. Modification of responses to search queries may take the form of content replacement, subtraction, addition of search results and/or recommended search queries contained within the responses, or an ordering of the content of such search results and/or recommended search queries.

Search settings may enable a user to adjust the extent to which that user or other users of the group influence each other with respect to search queries and/or responses to search queries. Search settings may be provided for a variety of parameters, such as a level of diversity, blending, and harmonization among group members, and may enable users to define group membership. In at least one implementation, adjustment of a search setting by a user may influence the search results/recommended search queries of a response and/or the ordering thereof that are returned to that user. In at least another implementation, adjustment of a search setting by a user may influence the search results/recommended search queries of responses and/or ordering thereof that are returned to other users of the group. In at least another implementation, adjustment of a search setting by a user may influence the responses that returned to that user and other users of the group, including some or all of the users of the group.

Search settings may be applied at a variety of different layers by a variety of functional entities. As one example, search settings may be applied by the search engine modifying queries that it receives and/or modifying responses that it outputs. As another example, search settings may be applied by a separate functional entity to cause modification of queries prior to submission of the queries to a search engine and/or cause modification of responses after receiving responses from the search engine. This separate functional entity may take the form of previously described group module 650 of FIG. 6, for example.

For example, user interface 800 may include a Group Search setting that enables a user to turn the group search functionality described herein on or off. Responsive to an "off" setting set at a first client device by a first user, that first client device/first user may not be included as a member of a group with one or more other client devices/users. As such, those other client devices/users would not receive responses that are modified or otherwise influenced based on the search activity contribution to the group by the first client device/first user. Conversely, the first client device/first user would not receive responses that are modified or otherwise influenced based on the search activity contribution to the group by the other client devices/users. Responsive to an "on" setting set at the first client device by the first user, that first client device/first user may be included as a member of a group with one or more client devices/users. As such, the first client device/first user and the other client devices/users of the group may influence each other's responses that are returned for a given set of search queries.

User interface 800 may include a Group Result Diversity setting that enables a user to adjust an amount of diversity in the responses that are returned to one or more members of the group for a given set of queries. A greater level of search result diversity between two or more users for a given set of search queries submitted by those users may result in a greater difference in search results/recommended search queries of the responses and/or ordering thereof that are returned to users of a group. A lesser amount of search result diversity between two or more users for a given search query or set of similar search queries submitted by those users may result in no or a lesser difference in the content or ordering of responses returned to the users of the group. Hence, group result diversity may influence modification of search results. Diversity settings disclosed herein may interact with other settings, such as blending or harmonization. In such cases, user interface 800 may not include one or more of the diversity, blending, or harmonization settings if, for example, control of those parameters is available through another of those influential parameters.

User interface 800 may include a Group Query Diversity setting that enables a user to adjust an amount of diversity in the search queries that are submitted to and/or utilized by the search engine among the one or more members of the group for a given set of queries. A greater amount of search query diversity between two or more users for a given search query or set of similar search queries submitted by those users may result in a greater difference between search queries. A lesser amount of search query diversity may result in no or less modification of search queries submitted to and/or utilized by the search engine.

User interface 800 may include a Group Result Blending setting that enables a user to adjust an amount of blending between the search results of two or more users of the group. A high level of group result blending may cause a response returned to a user to be blended to a greater extent with the responses returned to other users of the group. For example, if an ordered list of search results is returned to a first user that contains the order (A, B, C, D, E), the results returned to another user of the group for a different search query (normally E, F, G, H, I outside of the group) may include the order (A, D, E, F, C)—a combination of results that would otherwise be returned to users outside of the group. A lower level of group result blending may provide less or no modification of responses returned to the users of a group.

User interface 800 may include a Group Query Blending setting that enables a user to adjust an amount of blending between the search queries of two or more users of the group that are utilized by the search engine. A high level of group query blending may cause queries submitted by users of a group to be blended to a greater extent to create highly hybridized queries. For example, if a first user of a group that submits the search query "hotels" and a second user of the group later submits the search query "new york city", the search query submitted to and/or processed by the search engine for the second user may be modified to "hotels new york city"—a combination of the search terms obtained from multiple user's search queries of the group. Blending of search queries need not used all of the keywords of either or each query as provided in the above example, but only portions of some or all of the search queries of a group may be blended to obtain a modified search query that is submitted to or processed by the search engine. A lower level of group query blending may provide less or no modification of search queries among users of a group.

User interface 800 may include a Group Result Harmonization setting that enables a user to adjust an amount of harmonization between the search results of two or more users of the group. A high level of group result harmonization may cause a response returned to the requesting user to be modified or otherwise augmented so that the search results or recommended search queries of the response is the same as or more similar to one or more other responses returned to other members of the group. As one example, a response returned to a first user of a group responsive to a first search query, such as an ordered list of results, may influence an order of results of a second response returned to a second user of the group responsive to a second search query. In at least some implementations, a user's activity or interaction with respect to a set of search results or recommended search queries returned by a search engine may influence an order of search results or recommended search queries returned by the search engine to another user of the group. A lower level of group result harmonization may provide less or no modification of search results or recommended search queries contained within a response by a search engine among users of a group.

User interface 800 may include a Group Query Harmonization setting that enables a user to adjust an amount of harmonization between the search queries of two or more users of the group that are submitted to or utilized by the search engine. A high level of group query harmonization may cause a search query submitted by a member of a group to be modified or otherwise augmented so that the search query is the same as or more similar to one or more other search queries submitted by other members of that group. As one example, a search query of a group submitted by a first user, such as "new york hotels", may influence a subsequent search query of the group submitted by a second user, such as "hotels" to be modified to "new york hotels" by the search engine or by another functional entity prior to be submitted to the search engine or on-behalf of the search engine, thereby influencing the response returned by the search engine. A lower level of group query harmonization may provide less or no modification of search queries among users of a group.

User interface 800 further includes a group member setting that enables a user to view and edit membership in groups with which that user has been associated in the past or in a current use-setting. For example, a user may be associated with one, two, three, tens, hundreds, thousands, or more groups over the course of hours, days, weeks, or years. The user may remove other users from or add other users to these groups as group members. Hence, a user may control how search result or search query diversity, blending, or harmonization is applied over a group of users.

Figure 9:
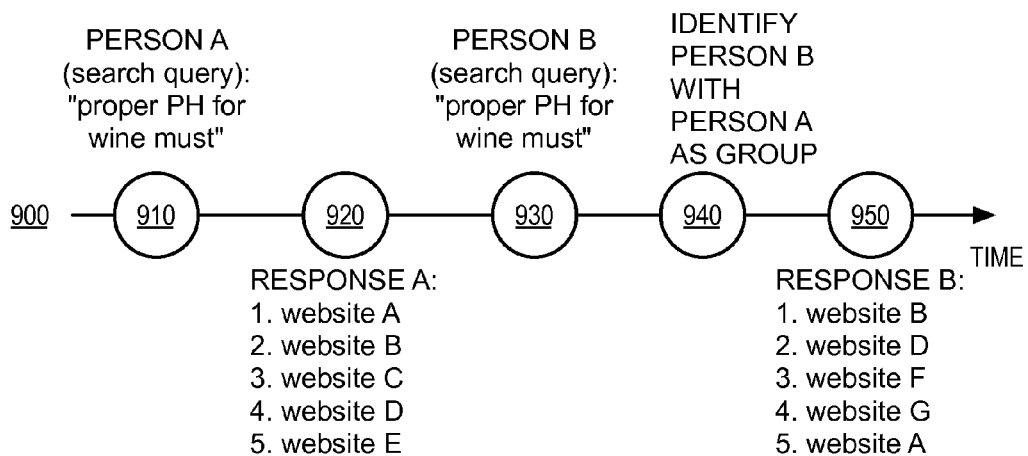
FIG. 9 is a timeline depicting an example use-scenario according to one implementation.

FIG. 9 is a timeline 900 depicting an example use-scenario according to one implementation. At 910, a first user (e.g., PERSON A) submits a search query (e.g., "proper PH for wine must") to a search engine. At 920, a response (e.g., REPONSE A) is returned by the search engine to PERSON A. The response includes an ordered list of search results. Additionally or alternatively, the response may include an ordered list of recommended search queries. For example, RESPONSE A includes a list of websites (e.g., website A—website E) presented as an ordered list. At 930, a second user (e.g., PERSON B) submits a search query (e.g., "proper PH for wine must"). The search queries in this example are identical for purpose of illustration. It will be understood that the search queries may be similar or substantially identical with minor differences in capitalization, keyword order, keyword modifiers (e.g., gerunds, plurals, etc.) relative to a root, etc. At minimum, the search queries of FIG. 9 are directed to similar topics of inquiry. At 940, the users are identified as forming a user group using, for example, one or more of the previously described methods. At 950, a response (e.g., RESPONSE B) is returned by the search engine to PERSON B. RESPONSE B includes a list of websites presented as an ordered list having a different order and/or composition of results than RESPONSE A. For example, RESPONSE B lists website B in a first ranked position instead of a second ranked position. RESPONSE B includes results not present in RESPONSE A, such as website F and website G. RESPONSE A includes results not present in RESPONSE B, such as website C and website E. In FIG. 9, the ranking of website B within RESPONSE B may be driven by previous activity of PERSON A. For example, website B may have been promoted in RESPONSE B relative to RESPONSE A because PERSON A did not select or otherwise traverse a link to website B from RESPONSE A. FIG. 9 provides an example of increasing group query diversity and/or group result diversity.

Alternatively, within FIG. 9, PERSON A may have selected or otherwise traversed a link to website B from RESPONSE A, thereby indicating PERSON A's response to the search results or recommended search queries presented to that user. In this scenario, PERSON A's selection of website B may instead cause website B to be promoted in RESPONSE B returned to PERSON B, which is associated with PERSON A as a group. In this case, website B may be presented in RESPONSE B with a higher ranking for the purpose of increasing group result harmonization.

Figure 10:
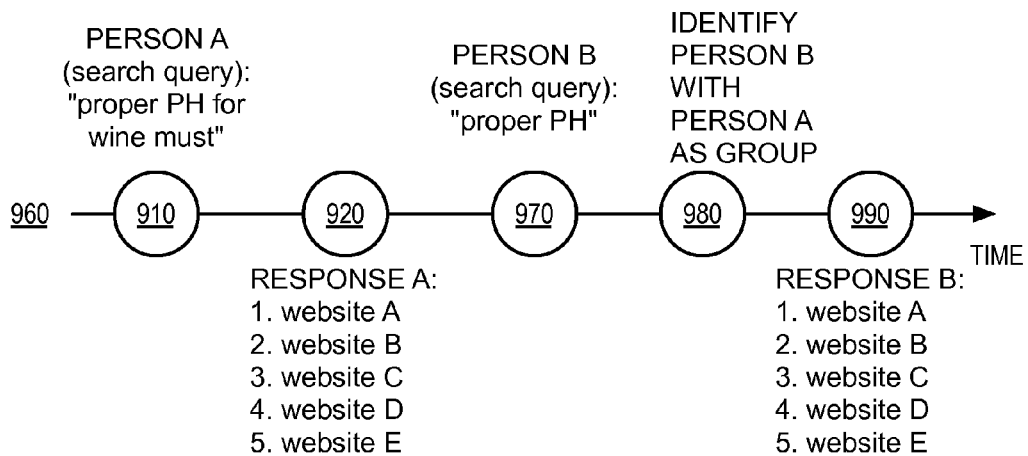
FIG. 10 is a timeline depicting another example use-scenario according to one implementation.

FIG. 10 is a timeline 960 depicting another example use-scenario according to one implementation. As previously described above, at 910, a first user (e.g., PERSON A) submits a search query (e.g., "proper PH for wine must") to a search engine. At 920, a response (e.g., REPONSE A) is returned by the search engine to PERSON A. At 970, a second user (e.g., PERSON B) submits a search query (e.g., "proper PH"). The search queries in this example are different, but contain some similar or related keywords for purpose of illustration, enabling these users to be associated with each other as a group. By contrast, if these search queries were entirely different and/or unrelated to each other, the users may not be associated with each other as a group. At 980, the users are identified as forming a user group. At 990, a response (e.g., RESPONSE B) is returned by the search engine to PERSON B. RESPONSE B includes a list of websites presented as an ordered list having the same or similar results as RESPONSE A. FIG. 10 provides an example of increasing group query harmonization, group result harmonization, group query blending, and/or group result blending. Hence, even though users have submitted different search queries, they may receive the same or similar results as a result of these users being associated with each other as a group.

The techniques described herein in with reference to group search may be used in combination with broader search techniques (e.g., such as those implemented by the GOOGLE brand of search engine) aimed at improving search results globally, within a certain geographic area, or within a certain temporal time frame among unrelated users. However, the group search techniques described herein are primarily aimed at providing more or less diversity, blending, or harmonization between or among groups of users that are performing coordinated search queries. These groups of users and their client devices may be physically co-located with each other and engaging in real-world conversations with each other, or may be currently engaged in an active conversation via a voice-based telephone call, video chat, SMS or email message chain, etc. Such real-world physical interactions or real-time/pseudo real-time communications often result in group-driven, collective inquiry, thought, disagreement, and discourse among members of the group, and often result in individual group members separately and concurrently issuing search queries directed to a related topic that was the subject of the physical interaction or real-time/pseudo real-time conversation. The augmentation of search queries and/or search engine responses in terms of diversification, harmonization, or blending is aimed at improving these types of physical, real-world interactions among users of the group, often to enable such users to arrive at one or more of a common solution, agreement, a correct result, or a broader understanding of the world.

Increased diversity among the search results that are returned to users is one non-limiting example of the type of augmentation that has the potential to considerably benefit the group, at least in terms of providing the group with a broader understanding of the world, while also reducing the likelihood of those users receiving and accessing search result content that is identical, but incorrect or narrow-sighted as an information source. This approach recognizes issues with current search optimization that seeks to return the highest ranked results to all users, but does not consider the validity or value of those results as an information source.

The methods, processes, and functions described herein may be performed by a logic subsystem of one or more computing devices executing instructions as will be appreciated by a person having ordinary skill in the art in light of the present disclosure. It should be understood that the embodiments, implementations, examples, and scenarios described herein are illustrative and not restrictive, since the scope of the invention or inventions is defined by the appended claims, currently or later presented, rather than by the description preceding them, and all changes that fall within metes and bounds of the claims, or equivalence of such metes and bounds thereof are therefore intended to be embraced by the claims.

The invention claimed is:

1. A method of facilitating collaborative group search, comprising:
   obtaining over a wide area network, a plurality of search queries initiated by a plurality of client devices;
   identifying a value of content relatedness of each search query of the plurality of search queries relative to each other search query of the plurality of search queries, the value based on a comparison of keywords of each search query to keywords of each other search query of the plurality of search queries;
   identifying a value of time proximity of each search query of the plurality of search queries relative to each other search query of the plurality of search queries;
   identifying a value of geographic proximity of each client device of the plurality of client devices relative each other client device of the plurality of client devices;
   identifying a group of two or more client devices from among the plurality of client devices, each client device of the group exhibiting:
      (a) content relatedness of a search query of the plurality of search queries initiated by that client device relative to one or more other search queries of the plurality of search queries initiated by one or more other client devices of the plurality of client devices based on the values of content relatedness,
      (b) time proximity of the search query initiated by that client device relative to the one or more other search queries based on the values of time proximity, and
      (c) geographic proximity of that client device to the one or more other client devices based on the values of geographic proximity; and
   processing search queries initiated by the group of two or more client devices of the plurality of search queries via a search engine to obtain search results for the group having increased search result diversity relative to each other; and
   returning the search results for the group to the two or more client device of the group via the wide area network.

2. The method of claim 1, further comprising:
   augmenting the search queries initiated by the group to obtain one or more augmented search queries having reduced search query relatedness relative to each other as compared to the search queries initiated by the group; and
   wherein processing the search queries initiated by the group includes processing the augmented search queries via the search engine to obtain the search results based on the augmented search queries.

3. The method of claim 1, further comprising:
   augmenting the search results to obtain one or more augmented search results having an increased difference in search result ordering relative to each other as compared to the search results; and
   wherein returning the search results to the two or more client devices of the group includes returning the augmented search results to the two or more clients of the group via the wide area network.

4. The method of claim 3, wherein returning the search results and the augmented search results to the two or more client device of the group includes returning the search results to a first client device of the group and the augmented search results to a second client device of the group.

5. The method of claim 4, wherein the search query of the first client device was obtained over the wide area network prior to the search query of the second client device.

6. The method of claim 1, wherein said increased search result diversity includes an increased difference in search result ordering relative to each other search result for the group.

7. The method of claim 1, wherein the search results include recommended search queries.

8. The method of claim 7, wherein said increased search result diversity includes an increased difference in ordering of the recommended search queries of the search results relative to each other search result for the group.

9. The method of claim 1, further comprising:
   wherein identifying the geographic proximity of that client device to the one or more other client devices is based, at least in part, on an access point used by that client device to access the wide area network; and
   wherein each client device of the group accesses the wide area network via the same access point, or the access point used by that client device overlaps with another access point by which another client device of the group accesses the wide area network.

10. The method of claim 1, wherein identifying the group of two or more client devices from among the plurality of client devices is further based, at least in part, on search settings of users of the plurality of client devices.

11. The method of claim 10, further comprising:
retrieving the search settings of the users of the plurality of client devices from respective user profiles based on a client device identifier for each client device of the plurality of client devices.

12. The method of claim 11, wherein the search settings for a user of a client device of the group indicate a level of diversity of the search results returned to that client device relative to the search results returned to other client devices of the group.

13. The method of claim 1, wherein inclusion of a client device of the plurality of client devices in the group is further based on a social relatedness between a user of that client device and another user of another client device of the group;
wherein social relatedness among users is identified based on one or more of prior communications between client devices of the users and from relationship information obtained from a social networking platform.

14. The method of claim 1, wherein inclusion of a client device of the plurality of client devices in the group is further based on historic membership of that client device in another group with another client device of the plurality of client devices.

15. The method of claim 1, further comprising:
comparing the value of content relatedness for each search query to a content relatedness threshold to determine whether a client device that initiated that search query is included in the group; or
comparing the value of time proximity for each search query to a time proximity threshold to determine whether s client device that initiated that search query is included in the group; or
comparing the value of geographic proximity for each client device to a time proximity threshold to determine whether that client device is included in the group.

16. A method of facilitating collaborative group search, comprising:
obtaining over a wide area network, a plurality of search queries initiated by a plurality of client devices;
retrieving search settings of users of the plurality of client devices from respective user profiles based on a client device identifier for each client device of the plurality of client devices;
identifying a group of two or more client devices from among the plurality of client devices, each client device of the group exhibiting:
(a) content relatedness of a search query of the plurality of search queries initiated by that client device relative to one or more other search queries of the plurality of search queries initiated by one or more other client devices of the plurality of client devices,
(b) time proximity of the search query initiated by that client device relative to the one or more other search queries,
(c) geographic proximity of that client device to the one or more other client devices,
(d) the search settings of the users of the plurality of client devices, the search settings indicating a level of diversity of search results returned to a client device relative to search results returned to other client devices of the group;
processing search queries initiated by the group of two or more client devices of the plurality of search queries via a search engine to obtain search results for the group having increased search result diversity relative to each other; and
returning the search results for the group to the two or more client device of the group via the wide area network.

17. The method of claim 16, wherein said increased search result diversity includes an increased difference in search result ordering relative to each other search result for the group.

18. A method of facilitating collaborative group search, comprising:
obtaining over a wide area network, a plurality of search queries initiated by a plurality of
identifying a group of two or more client devices from among the plurality of client devices, each client device of the group exhibiting:
(a) content relatedness of a search query of the plurality of search queries initiated by that client device relative to one or more other search queries of the plurality of search queries initiated by one or more other client devices of the plurality of client devices,
(b) time proximity of the search query initiated by that client device relative to the one or more other search queries, and
(c) geographic proximity of that client device to the one or more other client devices;
processing search queries initiated by the group of two or more client devices of the plurality of search queries via a search engine to obtain search results for the group having increased search result diversity relative to each other, the wherein the search results including recommended search queries, and said increased search result diversity including an increased difference in ordering of the recommended search queries of the search results relative to each other search result for the group; and
returning the search results for the group to the two or more client device of the group via the wide area network.

\* \* \* \* \*